Sept. 21, 1926.
W. HEGARTY
HOIST TROLLEY
Filed May 12, 1925
1,600,878
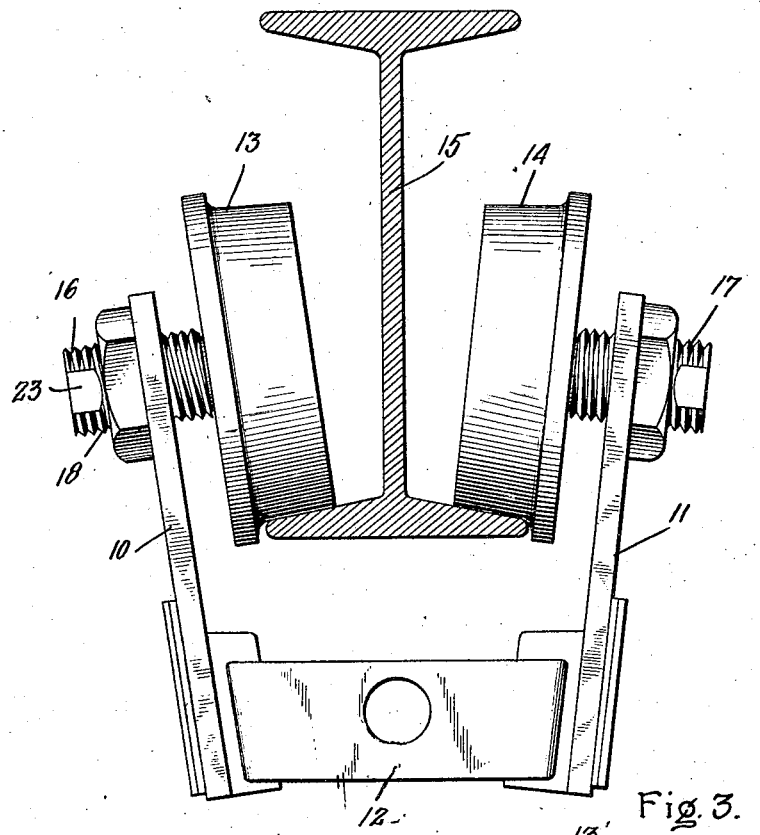
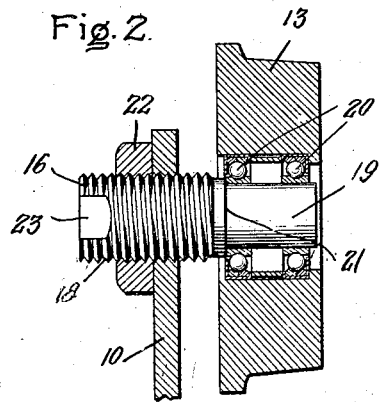
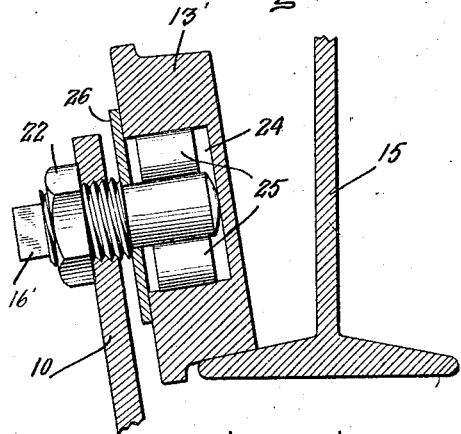
Inventor:
William Hegarty,
by
His Attorney.

Patented Sept. 21, 1926.

1,600,878

UNITED STATES PATENT OFFICE.

WILLIAM HEGARTY, OF BROOKLYN, NEW YORK, ASSIGNOR TO GENERAL ELECTRIC COMPANY, A CORPORATION OF NEW YORK.

HOIST TROLLEY.

Application filed May 12, 1925. Serial No. 29,757.

The present invention relates to hoist trolleys and provides an improved construction thereof whereby the track wheels may be easily adjusted to run upon different sizes of track and readily removed for inspection and repair without removing the trolley from the track or the hoist from the trolley.

These desirable results are obtained in accordance with the preferred form of my invention by providing a stub axle for the track wheel which is unsecured to the track wheel itself and has an enlarged portion extending through and screw-threaded into an opening in the side frame. By screwing the stub axle in one direction the track wheel may be moved laterally away from the side frame in order to engage properly with various sizes of trolley track while upon screwing the stub axle in the opposite direction it may be entirely removed from the track wheel and the side frame, thereby permitting an easy removal of the track wheel.

In the accompanying drawing Fig. 1 is a view, partially in section, of an I-beam hoist trolley embodying a preferred form of my invention; Fig. 2 is a view, partly in section, showing the assembly of the stub axle with the side frame and the trolley wheel; and Fig. 3 is a view partly in section, of a modified construction of the stub axle and track wheel.

In Fig. 1 the parts of the hoist trolley shown comprise the side frames 10 and 11 which are secured in opposing spaced relation by the connecting yoke 12 which is arranged to carry suitable hoisting mechanism not shown in the drawing. The track wheels 13 and 14 which run upon the lower web of the I-beam track 15 are mounted upon the stub axles 16 and 17 respectively.

Each of the stub axles 16 and 17 is unsecured to the track wheels mounted thereupon and in the preferred form of my invention illustrated is screw-threaded into the corresponding side frames 10 and 11. As more clearly shown in Fig. 2, the screw-threaded portion 18 of the stub axle 16 is of larger diameter than the portion 19 upon which the track wheel is mounted, preferably by means of anti-friction bearings, such as the ball bearings 20 illustrated. Preferably the enlarged portion 18 terminates in a shoulder 21, which serves to receive the end thrust of the track wheel, although the end of the stub axle may bear against a portion of the track wheel as illustrated in Fig. 3 to accomplish the same purpose if desired. A lock nut 22 is provided for firmly securing the stub axle in the side frame and a suitable recess 23 may be provided in the exterior end of the stub axle for receiving a socket wrench or screw-driver to facilitate screwing and unscrewing the stub axle.

From the preceding description it will be apparent that upon loosening the lock nut 22 and screwing the stub axle 16 into the frame 10 the track wheel 13 may be laterally adjusted to accommodate the trolley to various sizes of tracks. Furthermore, by simply unscrewing the stub axle 16 from the side frame 10 the axle, as well as the track wheel 13, may be easily removed. This is due to the fact that the stub axle, frame, and corresponding track wheel are so proportioned and arranged as to permit unrestrained upward or sidewise movement of the track wheel transverse of its axis of rotation upon removal of the stub axle. Hence, the track wheel 13 may be freely lifted from the track rail or rolled therealong and thus readily removed from the hoist trolley frame after the stub axle 18 is unscrewed from the exterior of the frame. Thus, if each stub axle of the usual form of four-wheel trolley, having two wheels on each side of the supporting track, is constructed in accordance with my invention, any one of the stub axles and the corresponding track wheels may be readily removed without dismounting the trolley from the track or removing the hoist from the trolley.

In the modification illustrated in Fig. 3, the trolley wheel 13' is provided with a suitable recess 24 for receiving the roller bearings 25 and one end of the stub axle 16' is rounded so as to bear against the bottom of the recess in order to receive the end thrust of the track wheel.

If desired, the exterior end of the stub axle may be squared as shown to permit rotation of the axle by an ordinary wrench. A dust guard 26 may be interposed between the track wheel 13' and the end of the enlarged screw-threaded portion of stub axle 16' in order to enclose the roller bearings 25 if desired. Since the squared end of stub axle 16' is accessible from the exterior of the side frame 10, the stub axle may be readily turned to permit adjustment or removal of the track wheel 13'.

What I claim as new and desire to secure by Letters Patent of the United States, is:

1. In a hoist trolley, the combination of side frames, a stub axle on each side frame, and a track wheel mounted on each stub axle, at least one of said stub axles extending through an opening in the corresponding side frame and said axle, frame, and corresponding track wheel arranged to permit unrestrained movement of the track wheel transverse its axis upon removal of the axle through the opening from the exterior of the frame.

2. In a hoist trolley, the combination of side frames disposed in spaced opposing relation, a stub axle on each side frame, a track wheel mounted on each axle, at least one of said axles being unsecured to the cooperating track wheel and extending through an opening in the corresponding side frame, the said axle, said frame and corresponding track wheel being arranged to permit unrestrained movement of the track wheel transverse its axis of rotation upon removal of the axle through the said opening from the exterior of the frame.

3. In a hoist trolley, the combination of side frames, a stub axle on each frame, a track wheel mounted on each axle, at least one of said axles being unsecured to the track wheel mounted thereupon and having an enlarged portion extending through an opening in the corresponding side frame and adjustably and detachably secured thereto to permit both lateral adjustment of the corresponding track wheel and said axle, frame and corresponding track wheel being arranged to permit unrestrained movement of the track wheel transverse its axis of rotation upon removal of the stub axle through the said opening from the exterior of the frame.

4. In a hoist trolley, the combination of side frames disposed in spaced opposing relation, a stub axle on each side frame, a track wheel mounted on each axle, at least one of said stub axles being unsecured to the track wheel mounted thereupon, and having an enlarged portion screw-threaded into an opening in the corresponding side frame and provided with means on its outer ends for rotating the axle to laterally adjust the position of the track wheel mounted thereupon, and said axle, frame and corresponding track wheel being arranged to permit unrestrained movement of the track wheel in a predetermined direction transverse the axis of rotation of the wheel upon removal of or to remove the axle through the said opening from the exterior of the frame.

In witness whereof, I have hereunto set my hand this 8th day of May 1925.

WILLIAM HEGARTY.